United States Patent [19]

Griffey

[11] Patent Number: 4,521,720
[45] Date of Patent: Jun. 4, 1985

[54] PROJECTION TV CRT BURN PROTECTION

[75] Inventor: Donald E. Griffey, Skokie, Ill.

[73] Assignee: Zenith Electronics Corporation, Glenview, Ill.

[21] Appl. No.: 383,040

[22] Filed: May 28, 1982

[51] Int. Cl.³ .............................................. H01J 29/52
[52] U.S. Cl. ..................................... 315/386; 315/384; 358/220
[58] Field of Search .................. 315/384, 386, 381; 358/165, 220, 60

[56] References Cited

U.S. PATENT DOCUMENTS 3,810,024  5/1974  Meacham ........................... 315/386
4,297,619 10/1981  Kiteley .
4,404,500  9/1983  Stow .................................. 315/386

OTHER PUBLICATIONS

Quasar Electronics Company Service Manual for Projection Chassis ANVDTS-800, published in 1978 by Matsushita Electric Corporation of America.

Primary Examiner—Theodore M. Blum
Assistant Examiner—Gregory C. Issing

[57] ABSTRACT

A system for preventing phosphor burn in a cathode ray tube (CRT) without a shadow mask such as used in a projection television receiver is disclosed. Horizontal drive circuit failure or the intermittent operation thereof is detected by means of a fast falling, horizontally derived, high voltage sweep transformer output which results in the application of a stable positive voltage to raster blanking circuitry for the duration of horizontal drive circuit failure or intermittent operation. Short time constant coupling circuitry permits the near simultaneous shutdown of the CRT upon detection of a horizontal drive circuit malfunction in avoiding the burning of a vertical line on the unprotected phosphor-coated faceplate of the CRT.

7 Claims, 1 Drawing Figure

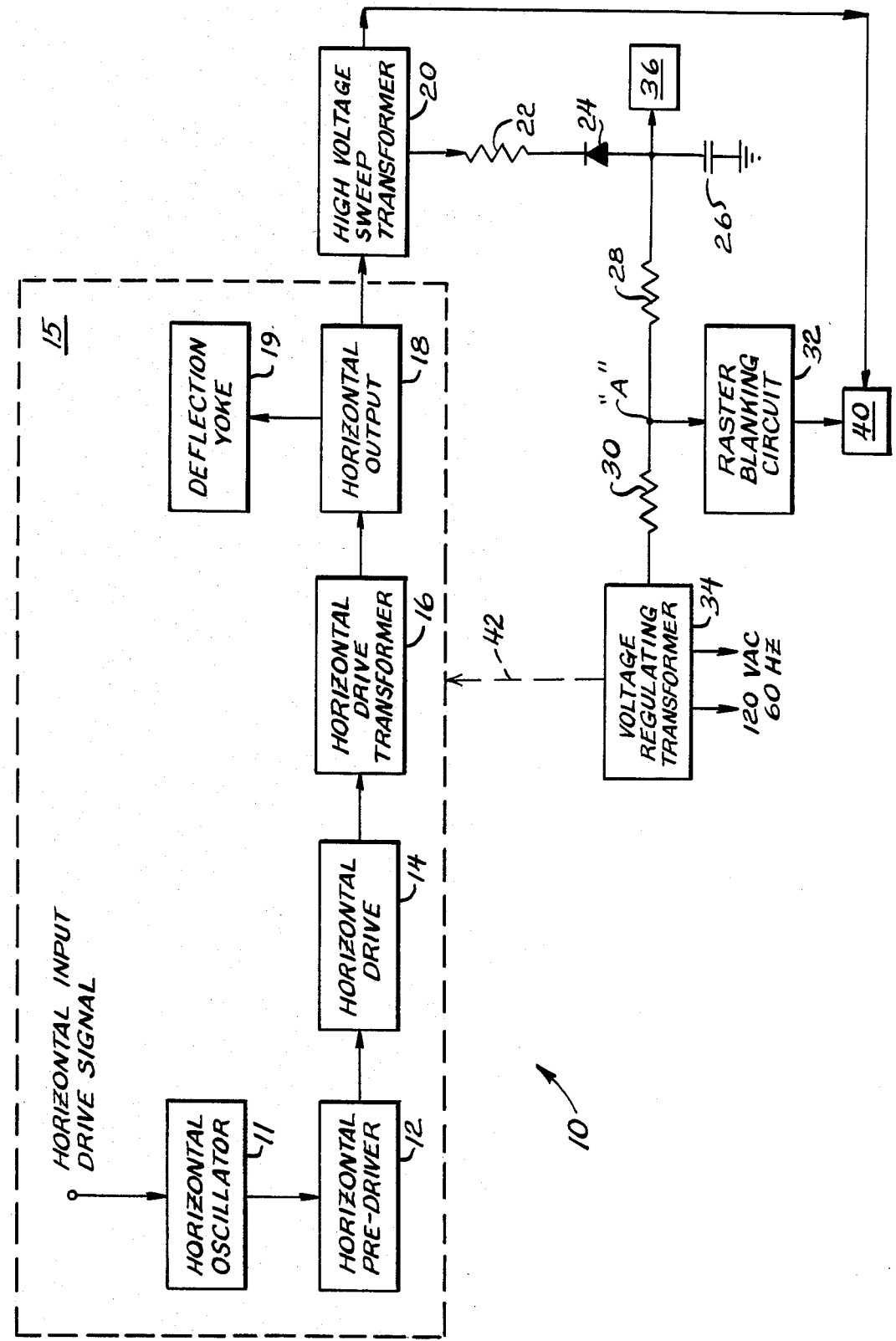

PROJECTION TV CRT BURN PROTECTION

BACKGROUND OF THE INVENTION

This invention relates generally to the CRT of a projection-type television receiver system, and is particularly directed to protecting the CRT of a projection-type television receiver from damage to its phosphor-coated faceplate.

In general, a video display utilizing a cathode ray tube (CRT) such as a television receiver includes a low voltage power supply for driving the scanning and receiver circuitry and a high voltage power supply for energizing the accelerating grids of the CRT. CRT electron beam current intensity is controlled by the relative potentials on the cathode and control grid electrodes with the cathode being coupled directly to the video input signal. The various electrode grids in the CRT perform functions such as brightness control, picture focusing and contrast and background selection.

Electron beam deflection circuitry provides for the raster scanning of the CRT's faceplate by the electron beam. The electron beam is scanned horizontally across the CRT's faceplate and sequentially deflected vertically in accomplishing the aforementioned raster scan. Damage to the phosphor coated faceplate of the CRT may result if the high voltage is applied to the various electron beam control grids while the deflection voltage is removed from the CRT. Loss of electron beam deflection signals may be due to failure of the horizontal and/or vertical deflection circuits, the absence, either intermittent or permanent, of a respective sweep drive input signal, or any number of related television receiver system malfunctions. If only one of the deflection signals is removed from the television receiver, the CRT's faceplate will be burned along a single straight line parallel to the sweep direction of the deflection system still in operation. If neither deflection signal is provided to the CRT, a burned and permanently damaged spot will occur on the viewing screen at the electron beam free-fall center of the CRT.

Phosphor burn is a greater potential problem in a CRT as utilized in a projection receiver than in a conventional television receiver. This is due to the unique configuration and operation of a projection television receiver (CRT). For example, a projection television system suffers from inherent limitations in the brightness of the reproduced image on the projection screen. These operating limitations are due to light losses in the image projection lens system, absorption and dispersion of the light energy containing image information incident upon the projection screen, reflection losses if a mirror system is used, and the large size of the projection screen relative to the total surface area of the projection television system's CRT, or CRT's.

In order to overcome the aforementioned limitations, various approaches have been implemented. The most common approach to increasing image intensity, or brightness, is to increase the inter-electrode voltages which accelerate the electrons toward the phosphor-coated faceplate. This has resulted in an increased danger of permanently damaging the CRT's screen by means of a continuous beam of undeflected, energetic electrons impinging on the same spot, or line, when deflection voltages are removed.

A shadow mask is typically utilized in a conventional color television receiver CRT. However, in order to increase the image intensity in a projection television receiver the shadow mask has been removed from the CRT and multiple CRT arrays, with each CRT emitting a light beam of one of the three different primary colors of red, green and blue, are commonly utilized. Thus, the energy absorption provided by a shadow mask in a conventional color CRT is not available in a projection television CRT, resulting in a greater potential for unregulated electron beam damage therein.

One approach to protecting the projection television system's CRT faceplate is disclosed in Quasar Electronics Company Service Manual for Projection Chassis ANVDTS-800 published in 1978 by Matsushita Electric Corporation of America. This system utilizes a deflection yoke for each of the primary color electron beams in the CRTs. Under normal operating conditions the outputs of the three transformers are provided in a balanced manner to two additional transformers. During abnormal operation of any of the three deflection yokes, the outputs of the two additional transformers become unbalanced producing a resultant output pulse used to drive CRT shutdown circuitry. A third additional transformer is used to detect the failure of all three deflection yokes and to generate an output signal for CRT shutdown in response thereto.

U.S. Pat. No. 4,297,619 to Kiteley discloses a system for preventing CRT phosphor burn in a multiple CRT projection television system in which only a single transformer in each of the vertical and horizontal deflection systems is utilized to detect the absence of a deflection yoke signal and to provide a signal to CRT shutdown circuitry in response thereto. Each of the transformers in the vertical and horizontal deflection systems is coupled to the three respective deflection yokes in the three CRTs. The absence of any one electron beam deflection signal or all three deflection signals results in activation of CRT shutdown circuitry.

While the aforementioned approaches provide for electron beam termination following failure of horizontal deflection yokes, they fail to account for situations which do not result in deflection yoke circuitry failure, but which may also for only a short period render the CRT susceptible to phosphor burn. This may occur in the case of an intermittent horizontal drive signal provided to a deflection system causing horizontal sweep to collapse and therefore show a single vertical line on the CRT's faceplate for several milliseconds. Because of the unique operating characteristics of a projection television CRT, this occurrence will generally result in phosphor burn in the CRT. In addition, prior art projection television CRT protection systems do not address the problem of total horizontal deflection system failure. The present invention is intended to overcome this limitation in a projection television receiver system and to offer CRT protection in an area not heretofore addressed by prior art systems.

OBJECTS OF THE INVENTION

Accordingly, it is an object of the present invention to avoid damage to the phosphor-coated faceplate of a CRT in a projection television receiver.

It is another object of the present invention to protect the phosphor-coated faceplate of a high voltage CRT which does not include a shadow mask in the event of horizontal deflection system malfunction in a television receiver.

Yet another object of the present invention is to provide protection for a CRT in a projection television receiver wherein a malfunction results in the intermittent application of a horizontal drive signal to electron beam deflection circuitry.

Still another object of the present invention is to provide a system for protecting the phosphor-coated faceplate of a projection television CRT which is readily adapted to and may be inexpensively and easily incorporated in existing projection television receivers.

BRIEF DESCRIPTION OF THE DRAWING

The appended claims set forth those novel features believed characteristic of the invention. However, the invention itself as well as further objects and advantages thereof will best be understood by reference to the following detailed description of a preferred embodiment taken in conjunction with the accompanying drawing which is a combination simplified block diagram and schematic diagram of a projection television receiver CRT burn protection system in accordance with the present invention.

DESCRIPTION OF THE PREFERRED EMBODIMENT

Referring to the FIGURE, there is shown a phosphor burn protection system 10 for a cathode ray tube (CRT) utilized in a projection television system in accordance with the present invention.

Horizontal input drive signals are provided to a horizontal oscillator 11 from a synchronization processing circuit (not shown). The synchronization processing circuit picks off the leading edge of a drive or synchronization pulse provided thereto and converts it into a pure synchronization pulse of the right shape and magnitude to synchronize the horizontal oscillator 11 with the horizontal synchronization pulses. The horizontal oscillator 11 provides a synchronized input signal to the horizontal pre-driver circuit 12 which, in turn, provides a synchronized, pulsed output to the horizontal drive circuit 14. The horizontal oscillator 11, which may be a phase locked loop, a multivibrator or any of a great variety of signal synchronizers, is precisely synchronized with the input drive signal. It is this signal synchronization which permits the horizontal drive system 15 to drive the horizontal sweep circuitry which includes the horizontal output circuit 18 for proper operation of the CRT 40.

The horizontal oscillator 11 processes the horizontal input drive signal to provide a re-synchronized properly timed input waveform to the horizontal pre-driver circuit 12 and thence to the horizontal drive circuit 14. A synchronization pulse which may have been in an improper timing position may thereby be moved in real time, insofar as the video signal is concerned, into proper position.

Horizontal pre-driver and horizontal drive circuits 12, 14 are transistorized switches in a preferred embodiment which in the ON position draw current through the horizontal drive transformer 16 storing energy in this transformer. When the horizontal drive circuit 14 is turned on, the horizontal output circuit 18, which is connected to the output of the horizontal drive transformer 16, is turned off thus providing a negative-going turn off signal to the horizontal output circuit 18. Thus, when the horizontal output circuit 18 is under a high voltage condition during retrace, it is subject to a negative-going turn off signal which provides positive control of the voltage applied to the horizontal output circuit 18 from the horizontal drive transformer 16. In this manner, high voltage pulses are provided from the horizontal output circuit 18 to a primary winding (not shown) of the high voltage sweep transformer 20. In addition, the horizontal output circuit 18, in combination with a damper diode (not shown), acts to push and pull current to and from the horizontal yoke 19 in generating the sawtooth deflection current required for electron beam deflection across the CRT's faceplate. As thus far described, the contemplated operation and configuration of the horizontal drive system 15 for energizing the high voltage sweep transformer 20 and the deflection yoke 19 is conventional in nature and does not form a part of the present invention.

The high voltage sweep transformer 20 includes the aforementioned primary winding and a plurality of secondary and tertiary windings (also not shown). As described, the high voltage sweep transformer 20 is conventional in design and operation. The high voltage output pulses from the various secondary and tertiary windings of the sweep transformer are utilized to, among other things, provide an electron beam accelerating potential to the anode and various control grids of the CRT, energize television receiver tuning circuitry, and control the voltage applied to the CRT's cathode. The path of the high voltage signal provided from the sweep transformer 20 to the television receiver's tuning system 36 is shown in the FIGURE.

The aforementioned tuning system signal is provided from one of the secondary windings (not shown) of the high voltage sweep transformer 20 via resistor 22 and diode 24 to the tuning system 36 of the television receiver. With resistor 22 performing a current limiting function, diode 24 is rendered conducting upon application of a high voltage negative pulse to the cathode thereof from the sweep transformer 20 and is nonconducting in the absence of this high voltage negative pulse.

In the event the horizontal input drive signal is no longer provided to the horizontal oscillator 11 or one or more of the aforementioned components in the horizontal drive system 15 fails, high voltage pulses will no longer be provided to the primary winding of the sweep transformer 20. In this event, negative pulses will no longer be provided to the cathode of diode 24 from the sweep transformer 20. Diode 24 will then be reverse biased and rendered nonconductive. The high voltage output from the sweep transformer 20 will fall very rapidly in response to the removal of input pulses to the primary winding thereof. With diode 24 no longer periodically rendered conductive, grounded capacitor 26 rapidly discharges to zero volts. Under normal operating conditions, with diode 24 periodically rendered conductive, the negative voltage provided from the sweep transformer 20 via diode 24 maintains point A at approximately −15 VDC. Also coupled to point A are a voltage regulating transformer 34 via a resistor 30 and a raster blanking circuit 32. When capacitor 26 discharges to zero volts with diode 24 reverse biased, a positive voltage output from the voltage regulating transformer 34 causes the voltage at point A to rise to approximately +10 VDC. The voltage regulating transformer 34, which is a conventional component in television receivers, is energized by the 120 VAC line source and outputs a plurality of DC voltages to various subsystems within the television receiver including the horizontal drive system 15 via line 42 (shown in dotted line form) for the energization thereof. One of these outputs is utilized in the present invention and is provided to point A as shown in the FIGURE.

A raster blanking circuit 32 is also coupled to point A and is a conventional television receiver component which is capable of shutting off the CRT beam upon detection of various hazardous or abnormal operating conditions. Typically, as in the preferred embodiment of the present invention, raster blanking circuit 32 is rendered inoperative when a negative voltage is applied thereto and is rendered operative for shutting off CRT 40 when a positive voltage is applied thereto. Thus, during normal television receiver operation a negative voltage is provided to raster blanking circuit 32 from the high voltage sweep transformer via diode 24 and point A to maintain raster blanking circuit 32 in an OFF state.

Similarly, upon the removal of this negative voltage from point A, a positive voltage is then provided to the raster blanking circuit 32 from the voltage regulating transformer 34 for rendering the raster blanking circuit ON and shutting off CRT 40 by terminating the electron beam current therein. Since the voltage regulating transformer 34 energizes the horizontal drive system 15, it will continue to provide a positive voltage following the removal of the horizontal input drive signal from the horizontal oscillator 11 or the failure of one of the components in the horizontal drive system. In fact, should the horizontal drive system be rendered inoperative, either intermittently or permanently, the output of the voltage regulating transformer 34 will actually increase in value because of the reduced load imposed upon it and will more effectively turn on the raster blanking circuit 32 in providing a positive voltage thereto. Resistors 30, 28 form a voltage dividing network for providing the proper voltages from the voltage regulating transformer 34 and the sweep transformer 20, respectively, to point A for normal CRT operation during which raster blanking circuit 32 is inoperative and for the blanking of the CRT.

In a preferred embodiment, the output of voltage regulating transformer 34 is a +131 VDC which is applied across resistor 30 (180 kilohms) while approximately −50 VDC is applied across grounded capacitor 26 to point A via resistor 28 (39 kilohms). Thus, under normal operating conditions point A is maintained at approximately −15 VDC while following the removal of input drive signals to the sweep transformer 20 and the discharge of grounded capacitor 26, a voltage of approximatey +10 VDC is maintained at point A in order to actuate raster blanking circuit 32 for terminating the video of the CRT 40.

There has thus been shown a system for protecting the phosphor-coated faceplate of a CRT in a projection television system when a horizontal input drive signal is no longer provided to the horizontal drive system of the television receiver or the horizontal drive system fails. A horizontally-derived fast-falling voltage generated by the removal of the horizontal drive system output is sensed for immediately providing an independently derived, rapidly rising voltage to raster blanking circuitry for instantaneously shutting down the CRT in response thereto.

While particular embodiments of the present invention have been shown and described, it will be apparent to those skilled in the art that changes and modifications may be made therein without departing from the invention and its broader aspects. The aim in the appended claims, therefore, is to cover all such changes and modifications as fall within the true spirit and scope of the invention.

I claim:

1. In a color projection television system having a horizontal drive circuit for energizing electron beam deflection means in generating horizontal output signals for displacing an electron beam across a phosphor-coated faceplate of a cathode ray tube in said projection color television system, said projection color television system further including high voltage transformer means coupled to said horizontal drive circuit and responsive to said horizontal output signals for generating high voltage signals for initiating and sustaining said electron beam in said cathode ray tube, a system for protecting the faceplate of said cathode ray tube comprising:

voltage sensing means coupled to said high voltage transformer means and responsive to said high voltage signals output therefrom for generating a first control signal when said horizontal output signals are removed from said high voltage transformer means;

raster blanking means coupled to said cathode ray tube and responsive to a second control signal provided thereto for terminating the electron beam in said cathode ray tube; and a voltage source including an AC-energized voltage regulating transformer coupled to said horizontal drive circuit for providing an energizing voltage thereto and selectively coupled to said raster blanking means and said voltage sensing means for generating and providing a second control signal of increasing magnitude to said raster blanking means in response to said first control signal for rapidly terminating said electron beam when said horizontal drive circuit no longer draws said energizing voltage from said voltage source and said horizontal output signals are no longer provided by said horizontal drive circuit to said high voltage transformer means.

2. The system of claim 1 wherein said voltage sensing means is coupled to a secondary winding of said high voltage transformer means and is responsive to a fast falling voltage derived from said horizontal drive circuit.

3. The system of claim 1 wherein said voltage sensing means includes unidirectional conducting means for coupling charge storage means to said high voltage transformer means and wherein said undirectional conducting means is rendered nonconductive when said horizontal output signals are removed from said high voltage transformer means causing the discharge of said charge storage means whereby said voltage source is coupled to said raster blanking means for providing said second control signal thereto.

4. The system of claim 3 wherein said directional conducting means comprises a diode and said charge storage means comprises a capacitor coupled to neutral ground potential.

5. The system of claim 1 wherein said raster blanking means is biased off by a negative voltage first control signal when said high voltage transformer means is energized by the horizontal output signals from the horizontal drive circuit and wherein said raster blanking means is biased on by a positive voltage second control signal for terminating said electron beam when said horizontal output signals are no longer provided by said horizontal output circuit.

6. In a color projection television system having a horizontal drive circuit energized by an AC-driven voltage regulating transformer for driving electron beam deflection means in generating horizontal output signals for displacing an electron beam across a phosphor-coated faceplate of a cathode ray tube in said color projection television system, said color projection television system further including high voltage transformer means coupled to said horizontal drive circuit and responsive to said horizontal output signals for generating high voltage signals for initiating and sustaining said electron beam in said cathode ray tube and raster blanking means coupled to said cathode ray tube and responsive to a shutdown signal for terminating the electron beam in said cathode ray tube, the improvement comprising:

generating said shutdown signal in response to a fast falling output voltage from said high voltage transformer means following the termination of said horizontal output signals from said horizontal drive circuit by coupling a rising output from said voltage regulating transformer to said raster blanking means in response thereto, wherein the rising output from said voltage regulating transformer comprises said shutdown signal and increases in value when said voltage regulating transformer no longer energizes said horizontal drive circuit.

7. In a color projection television system having a voltage regulating transformer, a projecting screen, three cathode ray tubes each having a phosphor screen for producing, by means of an electron beam incident upon said phosphor screen, three images each comprised of a primary color for projection on said projecting screen, and a horizontal drive circuit energized by said voltage regulating transformer and including a high voltage sweep transformer responsive to input drive signals for generating horizontal deflection signals for displacing an electron beam across each of said cathode ray tube screens and for generating high voltage signals for generating said electron beams therein, a protection system comprising:

voltage sensing means coupled to said high voltage sweep transformer for detecting a fast falling output voltage in response to the removal of input drive signals therefrom and for generating a first control signal in response thereto;

circuit means coupled to said high voltage sweep transformer and to said voltage sensing means for conducting current in a first direction when said sweep transformer is energized by said input drive signals and for conducting current in a second direction when said input drive signals are removed therefrom in response to receipt of said first control signal from said voltage sensing means;

raster blanking means coupled to each cathode ray tube for terminating the electron beam therein in response to a second control signal provided thereto; and conducting means coupling said circuit means and said voltage regulating transformer to said raster blanking means for providing said second control signal from said voltage regulating transformer to said raster blanking means when said circuit means conducts in said second direction, wherein said second control signal increases in value for rapidly terminating the electron beam when said horizontal drive circuit no longer provides said input drive signals to said sweep transformer and is no longer energized by said voltage regulating transformer.

* * * * *